US011778243B2

(12) United States Patent
Petro et al.

(10) Patent No.: US 11,778,243 B2
(45) Date of Patent: *Oct. 3, 2023

(54) METHODS AND APPARATUS OF IDENTIFICATION OF STREAMING ACTIVITY AND SOURCE FOR CACHED MEDIA ON STREAMING DEVICES

(71) Applicant: The Nielsen Company (US), LLC, New York, NY (US)

(72) Inventors: James Petro, Dunedin, FL (US); Daniel Nelson, Tampa, FL (US); Sandeep Tapse, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,841

(22) Filed: Jun. 27, 2022

(65) Prior Publication Data
US 2022/0400298 A1    Dec. 15, 2022

Related U.S. Application Data

(63) Continuation of application No. 17/360,763, filed on Jun. 28, 2021, now Pat. No. 11,375,247, which is a
(Continued)

(51) Int. Cl.
H04L 29/08     (2006.01)
H04N 21/231    (2011.01)
(Continued)

(52) U.S. Cl.
CPC ....... *H04N 21/23106* (2013.01); *H04L 65/61* (2022.05); *H04L 67/568* (2022.05);
(Continued)

(58) Field of Classification Search
CPC .. H04N 21/23106; H04L 65/61; H04L 67/568
(Continued)

(56) References Cited

U.S. PATENT DOCUMENTS 2,843,858 A    7/1958  Bjorklund
6,643,743 B1   11/2003 Hum et al.
(Continued)

FOREIGN PATENT DOCUMENTS

CN    103699640    4/2014
CN    105825166    8/2016
(Continued)

OTHER PUBLICATIONS

Chang et al., "Augmented Tagging System for Annotating and Sharing Videos on Mobile Device by Bar Scanner and Social Media," 2010 2nd International Conference on Education Technology and Computer (ICETC), 2010, 5 pages.
(Continued)

*Primary Examiner* — Adnan M Mirza

(57) ABSTRACT

Methods, apparatus, systems and articles of manufacture are disclosed for identification of streaming activity and source for cached media on streaming devices. An example apparatus disclosed herein includes at least one memory, instructions on the apparatus, and at least one processor to execute the instructions to: store, in a content identification information library, first content identification information of a first media presentation, wherein the first media presentation is a streamed media presentation; inspect a network connection of a media streaming device for network activity associated with a second media presentation; determine, in response to an absence of the network activity, the second media presentation is a cached media presentation; infer a streaming source of the second media presentation by matching second content identification information of the
(Continued)

second media presentation with the first content identification information of the first media presentation; and generate a second media credit for the second media presentation that includes an inferred streaming source identifier.

20 Claims, 9 Drawing Sheets

Related U.S. Application Data continuation of application No. 16/853,690, filed on Apr. 20, 2020, now Pat. No. 11,051,052, which is a continuation of application No. 15/678,093, filed on Aug. 15, 2017, now Pat. No. 10,631,018.

(51) Int. Cl.

| | | |
|---|---|---|
| *H04N 21/658* | (2011.01) | |
| *H04N 21/258* | (2011.01) | |
| *H04N 21/432* | (2011.01) | |
| *H04N 21/442* | (2011.01) | |
| *H04L 65/61* | (2022.01) | |
| *H04L 67/568* | (2022.01) | |
| *H04N 21/235* | (2011.01) | |
| *H04N 21/61* | (2011.01) | |

(52) U.S. Cl.
CPC ... *H04N 21/2353* (2013.01); *H04N 21/25891* (2013.01); *H04N 21/4325* (2013.01); *H04N 21/44209* (2013.01); *H04N 21/44222* (2013.01); *H04N 21/6582* (2013.01); *H04N 21/6125* (2013.01)

(58) Field of Classification Search
USPC .......................................................... 709/219
See application file for complete search history.

(56) References Cited

U.S. PATENT DOCUMENTS

| | | |
|---|---|---|
| 7,647,604 B2 | 1/2010 | Ramaswamy |
| 8,526,318 B2 | 9/2013 | Li et al. |
| 9,106,953 B2 | 8/2015 | McMillan |
| 9,135,154 B2 | 9/2015 | Schmieder et al. |
| 9,183,849 B2 | 11/2015 | Neuhauser et al. |
| 9,210,208 B2 | 12/2015 | Ramaswamy et al. |
| 9,294,815 B2 | 3/2016 | McMillan |
| 9,332,035 B2 | 5/2016 | Ramaswamy et al. |
| 9,640,156 B2 | 5/2017 | Neuhauser et al. |
| 10,631,018 B2 | 4/2020 | Petro et al. |
| 2003/0221127 A1 | 11/2003 | Risan et al. |
| 2006/0230170 A1 | 10/2006 | Chintala et al. |
| 2007/0271300 A1 | 11/2007 | Ramaswamy |
| 2008/0104246 A1 | 5/2008 | Katz et al. |
| 2010/0115060 A1* | 5/2010 | Julia .................. G06F 16/9535 709/219 |
| 2011/0145211 A1* | 6/2011 | Gerber ................ H04L 41/5058 709/224 |
| 2011/0191447 A1 | 8/2011 | Dazzi et al. |
| 2013/0007794 A1 | 1/2013 | Besehanic et al. |
| 2013/0060912 A1 | 3/2013 | Rensin et al. |
| 2013/0325888 A1 | 12/2013 | Oneppo et al. |
| 2014/0143647 A1 | 5/2014 | Reshadi et al. |
| 2015/0319490 A1 | 11/2015 | Besehanic |
| 2015/0319500 A1 | 11/2015 | McMillan |
| 2016/0065441 A1 | 3/2016 | Besehanic |
| 2016/0066005 A1 | 3/2016 | Davis et al. |
| 2016/0094876 A1 | 3/2016 | Nelson et al. |
| 2017/0142200 A1 | 5/2017 | Kodner et al. |
| 2020/0252662 A1 | 8/2020 | Petro et al. |

FOREIGN PATENT DOCUMENTS

| | | |
|---|---|---|
| CN | 105900094 | 8/2016 |
| CN | 106156363 | 11/2016 |
| CN | 106209725 | 12/2016 |
| CN | 106462858 | 2/2017 |
| EP | 2843858 | 3/2015 |
| WO | 2011103541 A1 | 8/2011 |

OTHER PUBLICATIONS

International Searching Authority "International Search Report," dated Dec. 10, 2018 in connection with International Patent Application No. PCT/IB2018/056141, 4 pages.

International Searching Authority, "Written Opinion," dated Dec. 10, 2018 in connection with International Patent Application No. PCT/IB2018/056141, 4 pages.

Canadian Intellectual Property Office "Office Action," dated Apr. 1, 2021 in connection with Canadian Patent Application No. 3073168, 4 pages.

European Patent Office, "Extended European Search Report," dated Mar. 17, 2021, in connection with European Patent Application No. 18846787.2, 7 pages.

European Patent Office "Communication Pursuant to Rules 70(2) and 70a(2) EPC and Supplemental European Search Report," dated Apr. 8, 2021, in connection with European Patent Application No. 18846787.2, 3 pages.

United States Patent and Trademark Office, "Non-Final Office Action," issued in connection with U.S. Appl. No. 16/853,690, dated Oct. 1, 2020, 6 pages.

United States Patent and Trademark Office, "Notice of Allowance and Fee(s) Due," issued in connection with U.S. Appl. No. 16/853,690, dated Feb. 23, 2021, 5 pages.

United States Patent and Trademark Office, "Non-Final Office Action," issued in connection with U.S. Appl. No. 15/678,093, dated Jan. 25, 2019, 9 pages.

United States Patent and Trademark Office, "Final Office Action," issued in connection with U.S. Appl. No. 15/678,093, dated May 20, 2019, 21 pages.

United States Patent and Trademark Office, "Notice of Allowance and Fee(s) Due," issued in connection with U.S. Appl. No. 15/678,093, dated Dec. 11, 2019, 5 pages.

International Bureau, "International Preliminary Report on Patentability," dated Feb. 27, 2020, in connection with International Patent Application No. PCT/IB2018/056141, 6 pages.

Intellectual Property Office "Search Report," issued in connection with GB Patent Application No. GB2201452.6 dated Feb. 25, 2022, 3 pages.

United States Patent and Trademark Office, "Notice of Allowance and Fee(s) Due," issued in connection with U.S. Appl. No. 17/360,763, dated Feb. 22, 2022, 5 pages.

United States Patent and Trademark Office, "Non-Final Office Action," issued in connection with U.S. Appl. No. 17/360,763, dated Nov. 2, 2021, 6 pages.

China National Intellectual Property Administration, "Office Action", issued in connection with CN Patent Application No. 201880061912.6 dated Jul. 5, 2021, 16 pages.

China National Intellectual Property Administration, "Notice of Decision of Granting Patent Right for Invention", issued in connection with CN Patent Application No. 201880061912.6 dated Jan. 14, 2022, 5 pages.

Canadian Intellectual Property Office, "Office Action", issued in connection with Canadian Patent Application No. 3,073,168 dated Feb. 10, 2022, 3 pages.

Canadian Intellectual Property Office, "Examination Report", issued in connection with Canadian patent Application No. 3,073,168, dated Jan. 4, 2023, 4 pages.

* cited by examiner

US 11,778,243 B2

METHODS AND APPARATUS OF IDENTIFICATION OF STREAMING ACTIVITY AND SOURCE FOR CACHED MEDIA ON STREAMING DEVICES

RELATED APPLICATION

This patent arises from a continuation of U.S. patent application Ser. No. 17/360,763, filed on Jun. 28, 2021, and titled "Methods and Apparatus of Identification of Streaming Activity and Source for Cached Media on Streaming Devices" which is a continuation of U.S. patent application Ser. No. 16/853,690, filed on Apr. 20, 2020, and titled "Methods and Apparatus of Identification of Streaming Activity and Source for Cached Media on Streaming Devices" which is a continuation of U.S. patent application Ser. No. 15/678,093, filed on Oct. 23, 2015 and entitled "METHODS AND APPARATUS OF IDENTIFICATION OF STREAMING ACTIVITY AND SOURCE FOR CACHED MEDIA ON STREAMING DEVICES." U.S. patent application Ser. No. 17/360,763, U.S. patent application Ser. No. 16/853,690 and U.S. patent application Ser. No. 15/678,093 are hereby incorporated by reference in their entireties. Priority to U.S. patent application Ser. No. 17/360,763, U.S. patent application Ser. No. 16/853,690 and U.S. patent application Ser. No. 15/678,093 are claimed.

FIELD OF THE DISCLOSURE

This disclosure relates generally to media metering and, more particularly, to methods and apparatus of identification of streaming activity and streaming source for cached media on streaming devices.

BACKGROUND

Media producers, media providers, advertisers, product manufactures represented in advertisements, and many other entities utilize information about the presentation of media. Such information is often collected through the use of panels comprised of persons (e.g., panelists) who have agreed to have their exposure to media monitored. For example, audio of media may be transmitted with identifying information (e.g., embedded watermarks or codes) that identifies the media. Panelists may be supplied with meters (e.g., portable meters carried and/or worn by the panelists) that collect the audio and extract the identifying information. The information may be transmitted to a collection facility where the results from multiple panelists are combined to generate reports comprising information about media presentation.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
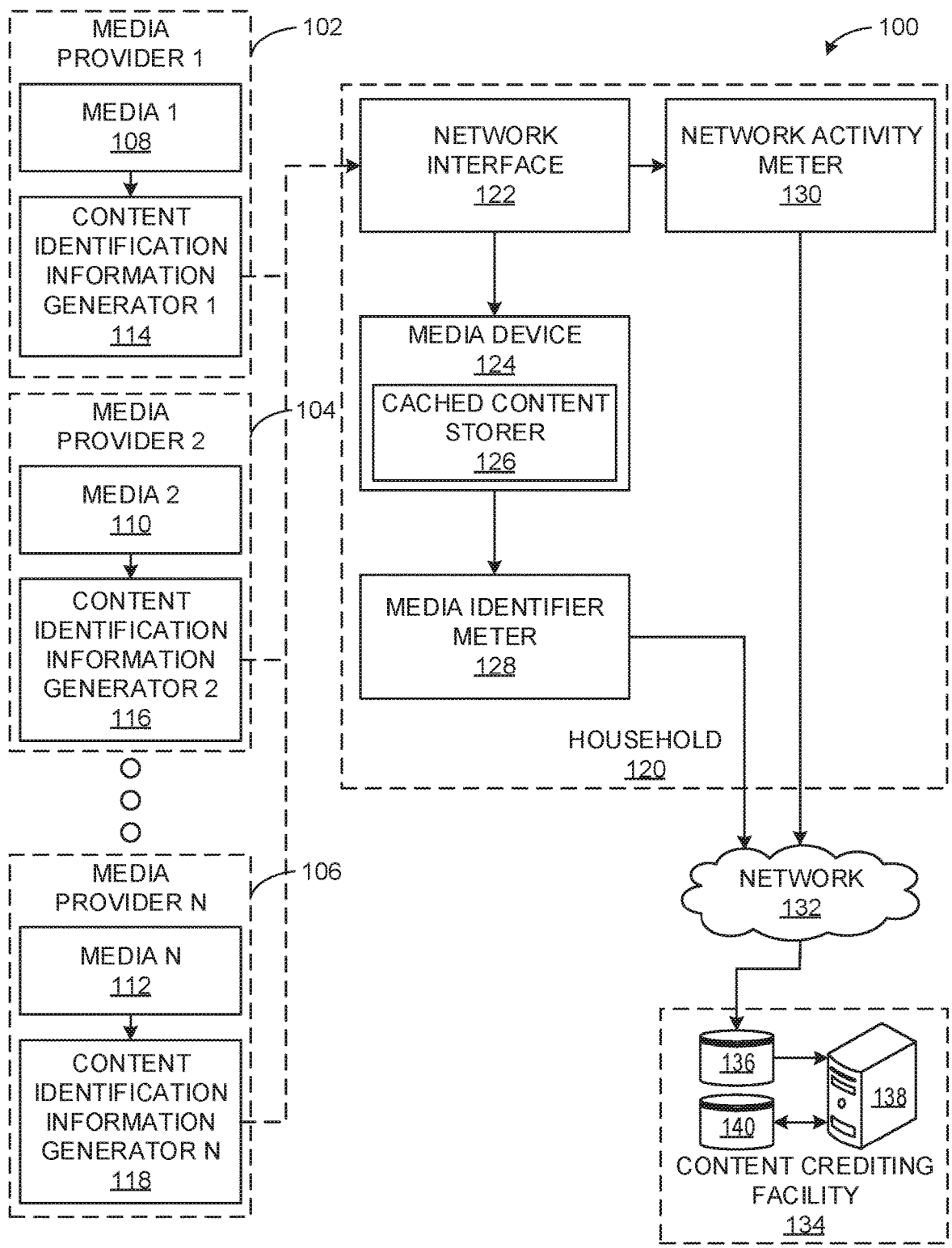
FIG. 1 is a block diagram of an example environment in which a system for identifying streaming activity and streaming source for cached media on media devices constructed with the teachings of this disclosure operates.

In recent years, media devices have been provided with Internet connectivity and the ability to retrieve media from the Internet. As such, media exposure has shifted away from conventional methods of presentation, such as broadcast television, towards presentation via consumer devices accessing media streaming via the Internet. Media devices capable of accessing media streaming via the Internet is further defined herein as a "media streaming devices".

Media providers and/or other entities such as, for example, advertising companies, broadcast networks, etc. are often interested in the viewing, listening, and/or media behavior of audience members and/or the public in general. The streaming media usage and/or exposure habits of monitored audience members, as well as demographic data about the audience members, are collected and used to statistically determine the size and demographics of an audience of interest. Often times when measuring the streaming usage and/or exposure habits of monitored audience members, substantial network activity (measured as bandwidth usage) is used to determine whether media is being streamed. As used herein, "substantial network activity" is defined as a volume of network activity equal to or greater than the volume of network activity required to support the streaming of a media presentation.

However, on newer models of media streaming devices, the option to cache a streamed media presentation and store it for later presentation has become common. As used herein, "cache" and/or "cached" are defined to mean a temporary storage space or memory that allows for rapid retrieval. In some examples as data caching relates to media presentations, video and audio data can be cached on a media streaming device as the media presentation is streamed. During a repeat presentation of the media, the media presentation will be accessed via the stored video and audio data, as opposed to streamed from the Internet. In such examples, because the program has been cached, no bandwidth is used for the media presentation and, in some such examples, network activity will not be detected. With current protocols for measuring and crediting streaming media, streaming media that is cached on a media streaming device will not be properly credited.

Turning to the figures, a block diagram of an example system 100 for distributing media and, in some examples, capable of identifying streaming content and streaming source on caching capable devices includes media providers 102, 104, and 106. The media providers 102, 104, and 106, in some examples, include media 108, 110, and 112, and content identification information generators 114, 116, and 118. The example system 100 further includes a household 120 which can, in some examples, include a network interface 122, a media device 124 which, in some examples, includes a cached content storer 126. The example household 120 can further include a media identifier meter 128, and a network activity meter 130. Further, the example system 100 can include a network 132, and a content crediting facility 134 which can, in some examples, includes a metering database 136, a media crediting analyzer 138, and a media crediting database 140.

The example media provider(s) 102, 104, and/or 106 of the illustrated example of FIG. 1 correspond(s) to any one or more media provider(s) (e.g., Netflix®, YouTube®, Hulu®, Amazon Video®, Pandora®) capable of providing media for presentation. The media provided by the media provider(s) 102, 104, and/or 106 can be any type(s) of media, such as audio, video, multimedia, etc. Additionally, the media can correspond to live media, streaming media, broadcast media, stored media, on-demand content, etc.

The example media 108, 110, and/or 112 of the illustrated example of FIG. 1 correspond(s) to any type(s) of media such as audio, video, multimedia, etc. In some such examples, the media 108, 110, and/or 112 can be at least one of an audio media and video media of a media presentation as distributed by the media provider(s) 102, 104, and/or 106.

The example content identification information generator(s) 114, 116, and/or 118 of the illustrated example of FIG. 1 correspond(s) to a device capable of at least one of generating content identification information (e.g., media program, media episode, media ID, media timestamp, etc.) and generating an identifier for one or more of the media 108, 110, and/or 112 in the form of watermarks, embedded codes, signatures, fingerprints, metadata, etc.

In some examples, the example content identification information generator(s) 114, 116, and/or 118 will embed at least one of audio or video watermarks in at least one of the media 108, 110, and/or 112. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to content identification information.

Additionally or alternatively, the example content identification information generator(s) 114, 116, and/or 118 will generate an identifier in the form of audio signatures. As used herein, the term "fingerprint" and "signature" are used interchangeably and are defined herein to mean a proxy for identifying media that is generated from one or more inherent characteristics of the media. Signature-based media monitoring generally involves matching a monitored signature and a reference signature. When a match is found, the monitored media can be identified as corresponding to the particular reference media represented by the reference signature that matched the monitored signature and content identification information can be determined.

Additionally or alternatively, any manner of generating an identifier for the one or more media 108, 110, and/or 112 that can be mapped to content identification information for the one or more media 108, 110, and/or 112 can be utilized by the example content identification information generator(s) 114, 116, and/or 118.

The example household 120 of the illustrated example of FIG. 1 is a household in which at least one of a streamed media presentation or a cached presentation of a streamed media presentation is viewed. In some such examples, the media presentation viewed is the at least one of media 108, 110, and/or 112. Additionally, the example household 120 can further include the network interface 122, the media device 124 which can, in some examples, include the cached content storer 126, the media identifier meter 128, and the network activity meter 130.

The example network interface 122 of the illustrated example of FIG. 1 is the Internet. However, the example network interface 122 may be implemented using any suitable wired and/or wireless network(s) including, for example, one or more data buses, one or more Local Area Networks (LANs), one or more wireless LANs, one or more cellular networks, one or more private networks, one or more public networks, etc. The example network interface 122 enables one or more of the example media provider(s) 102, 104, and/or 106 to be in communication with the example media device 124 and the network activity meter 130. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The example media device 124 of the illustrated example of FIG. 1 is a device that retrieves one or more media 108, 110, and/or 112 from one or more of the media provider(s) 102, 104, and/or 106 for presentation. In some examples, the media device 124 retrieves a streamed media presentation via the Internet. In some examples, the media device 124 is capable of directly presenting media (e.g., via a display) while, in other examples, the media device 124 presents the media on separate media presentation equipment (e.g., speakers, a display, etc.). Thus, as used herein "media devices" may or may not be able to present media without assistance from a second device. Media devices are typically consumer electronics. For example, the media device 124 can be a personal computer such as a laptop computer, and thus, is capable of directly presenting media (e.g., via an integrated and/or connected display and speakers). While in the above, a personal computer is shown, any other type(s) and/or number(s) of media device(s) capable of streaming media may additionally or alternatively be used. For example, Internet-enabled mobile handsets (e.g., a smartphone, an iPod®, etc.), video game consoles (e.g., Xbox®, PlayStation® 4, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example cached content storer 126 of the illustrated example of FIG. 1 corresponds to a device capable of caching one or more media presentations locally at the media device 124. The one or more media presentations cached by the example cached content storer 126 can further be presented by the media device 124 for the duration that the media presentation is stored in the cached content storer 126. In some such examples, the cached content storer 126 can be implemented by one or more volatile memories such as Synchronous Dynamic Random Access Memory (SDRAM), Dynamic Random Access Memory (DRAM), RAMBUS, Dynamic Random Access Memory (RDRAM) and/or any other type of random access memory device. Additionally or alternatively, the cached content storer 126 can be implemented by one or more non-volatile memories such as flash memory and/or any other desired type of memory device.

The example media identifier meter 128 of the illustrated example of FIG. 1 corresponds to any device capable of at least one of detecting and decoding an identifier in one or more of the media 108, 110, and/or 112 as generated by the one or more content identification information generator(s) 114, 116, and/or 118.

In some such examples, the example media identifier meter 128 can only detect the presence of an identifier, wherein the identifier information in such examples is further to be decoded via a separate entity. Additionally or alternatively, the example media identifier meter 128 can both detect and decode an identifier.

The example media identifier meter 128 can further be implemented by a user (i.e., a panelist) worn device. In such examples, the media identifier meter 128 determines viewing data of the user, regardless of media device. Additionally or alternatively, the example media identifier meter 128 can be implemented by a device embedded or otherwise included in the example media device 124. In such examples, the media identifier meter 128 determines media presented at the media device 124.

The example network activity meter 130 of the illustrated example of FIG. 1 corresponds to a device capable of detecting network activity at the household 120 distributed by the network interface 122. In some examples, the network activity at the household 120 will be caused by streaming media to the media device 124 from the network interface 122. In such examples, the network activity meter 130 can detect a streaming source (e.g., Netflix®, Hulu®, Sling TV®, MLB.tv, etc.) of the network activity as presented by the media device 124. As used herein, the source of the network activity detected by the network activity meter 130 is further referred to as a "streaming source". Additionally, as used herein, "meter data" or "metering data" further refers to at least one of a media identifier, network activity information, and streaming source information as acquired by at least one of the media identifier meter 128 and the network activity meter 130.

The example network 132 of the illustrated example of FIG. 1 is the Internet. However, the example network 132 may be implemented using any suitable wired and/or wireless network(s) including, for example, one or more data buses, one or more Local Area Networks (LANs), one or more wireless LANs, one or more cellular networks, one or more private networks, one or more public networks, etc. Additionally or alternatively, the network interface 122, in some examples, is further communicatively coupled to the network 132. The example network 132 enables one or more of the media identifier meter 128 and the network activity meter 130 to be in communication with the content crediting facility 134.

The example content crediting facility 134 of the illustrated example of FIG. 1 corresponds to a system that can, utilizing an input including meter data, generate a media credit for at least one of a streamed or cached media presentation. Further, the content crediting facility 134 can, in some such examples, include a metering database 136, a media crediting analyzer 138, and a media crediting database 140.

The example metering database 136 of the illustrated example of FIG. 1 corresponds to a database that can, in some such examples, store meter data from at least one of the media identifier meter 128 and network activity meter 130.

The example metering database 136 can be implemented by a volatile memory (e.g., a Synchronous Dynamic Random Access Memory (SDRAM), a Dynamic Random Access Memory (DRAM), RAMBUS Dynamic Random Access Memory (RDAM), etc.) and/or a non-volatile memory (e.g., flash memory). The example metering database 136 can additionally or alternatively be implemented by one or more mass storage devices such as hard disk drive(s), compact disk drive(s), digital versatile disk drive (s), solid-state drives(s), etc. While in the illustration the example metering database 136 is illustrated as a single database, the example metering database 136 can be implemented by any number and/or type(s) of databases.

The example media crediting analyzer 138 of the illustrated example of FIG. 1, further detailed below, corresponds to a device capable of, in response to receiving meter data from the example metering database 136, generating a media credit for a media presentation as distributed by the one or more media provider(s) 102, 104, and/or 106. In some such examples, the media presentation can be cached by the cached content storer 126 at the media device 124. Additionally or alternatively, the media presentation can be streamed at the media device 124. For each of streaming media presentations and cached media presentations, the example media crediting analyzer 138 is capable of generating a proper media credit for the media presentation.

The example media crediting database 140 of the illustrated example of FIG. 1 corresponds to a database which can, in some such examples, store one or more media credits generated by the media crediting analyzer 138. As used herein, a "media credit" can include at least one of a media device identifier, a streaming source identifier, one or more content identifiers, and at least one of a presentation start time, end time, and period. Additionally or alternatively, one or more media credits as stored in the media crediting database 140 can further be at least one of retrieved and searched by the media crediting analyzer 138.

The example media crediting database 140 can be implemented by a volatile memory (e.g., a Synchronous Dynamic Random Access Memory (SDRAM), a Dynamic Random Access Memory (DRAM), RAMBUS Dynamic Random Access Memory (RDAM), etc.) and/or a non-volatile memory (e.g., flash memory). The example media crediting database 140 can additionally or alternatively be implemented by one or more mass storage devices such as hard disk drive(s), compact disk drive(s), digital versatile disk drive(s), solid-state drives(s), etc. While in the illustration the example media crediting database 140 is illustrated as a single database, the example media crediting database 140 can be implemented by any number and/or type(s) of databases.

In operation, the block diagram of example system 100 distributes media from one or more media provider(s) 102, 104, and/or 106 in the form of media 108, 110, and/or 112. Further, content identification information generator(s) 114, 116, and/or 118 generate content identification information and media identifiers for at least one of the media 108, 110, and/or 112 which are further received at the household 120 by the network interface 122. The media device 124 receives the one or more media 108, 110, and/or 112 and can store the one or more media 108, 110, and/or 112 in the cached content storer 126. At least one of the media identifier meter 128 and the network activity meter 130 determines metering data for the presented media, and are further to transmit the metering data through the network 132 to the metering database 136, included or otherwise implemented in the content crediting facility 134. The metering data, as stored by the metering database 136, is analyzed by the media crediting analyzer 138. Upon generation of a media credit by the media crediting analyzer 138, the media credit is transmitted to the media crediting database 140.

The example system 100 of FIG. 1 includes three media providers 102, 104, and 106, three media 108, 110, and 112, three content identification information generators 114, 116, and 118, one household 120, one network interface 122, one media device 124, one cached content storer 126, one media identifier meter 128, one network activity meter 130, one network 132, one content crediting facility 134, one metering database 136, one media crediting analyzer 138, and one media crediting database 140. However, identification of streaming activity for cached content as disclosed herein can be used with any number(s) of media providers 102, 104, and 106, media 108, 110, and 112, content identification information generators 114, 116, and 118, households 120, network interfaces 122, media devices 124, cached content storers 126, media identifier meters 128, network activity meters 130, networks 132, content crediting facilities 134, metering databases 136, media crediting analyzers 138, and media crediting databases 140. Further, although the media device 124, media identifier meter 128, and network activity meter 130 are illustrated as being separate elements in FIG. 1, at least one of the media identifier meter 128, and network activity meter 130 can be implemented by or otherwise included in the media device 124.

Additionally or alternatively, although the metering database 136, the media crediting analyzer 138, and the media crediting database 140 are shown as being separate elements in FIG. 1, at least one of the metering database 136, and the media crediting database 140 can be implemented by or otherwise included in the media crediting analyzer 138.

Figure 2:
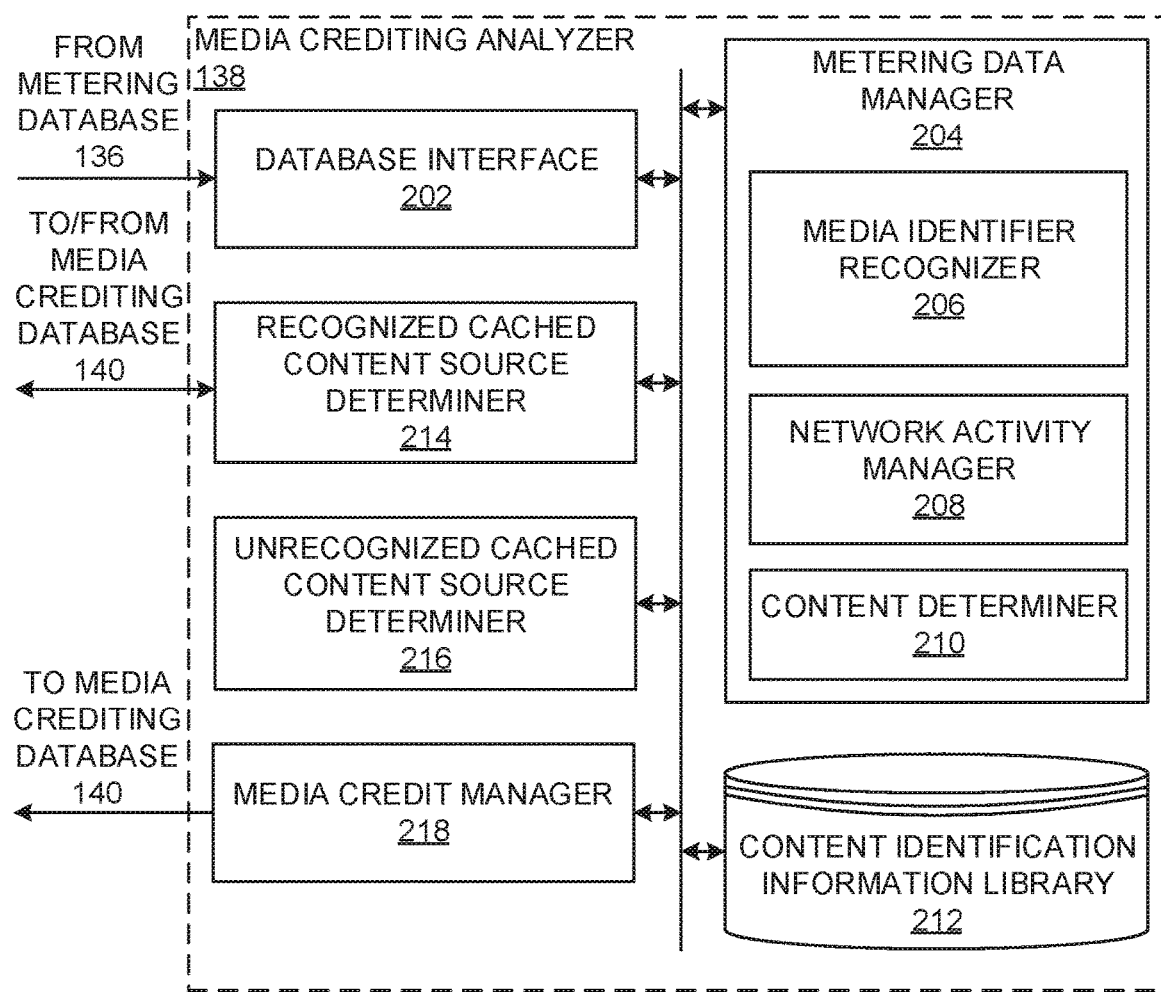
FIG. 2 is a block diagram of an example implementation of the content crediting facility of FIG. 1.

A block diagram further detailing the media crediting analyzer 138 of FIG. 1 is illustrated in FIG. 2. The example media crediting analyzer 138 of FIG. 2 can, for at least one of recognized streaming media, unrecognized streaming media, recognized cached media, and unrecognized cached media, create a media credit properly crediting all received metering data for a presented media.

Looking to FIG. 2, the illustrated media crediting analyzer 138 includes an example database interface 202, an example metering data manager 204 which can, in some examples, include an example media identifier recognizer 206, an example network activity manager 208, and an example content determiner 210, an example content identification information library 212, an example recognized cached content source determiner 214, an example unrecognized cached content source determiner 216, and an example media credit manager 218. Additionally, as used herein, at least one of the recognized cached content source determiner 214 and the unrecognized cached content source determiner 216 may be referred to as a "cached content source determiner."

In the illustrated example of FIG. 2, the database interface 202 can at least one of transfer data to and receive data from the metering database 136. The database interface 202 can further at least one of transfer data to and receive data from any component of the media crediting analyzer 138. In some such examples, the database interface 202 can be implemented by any type of interface standards, such as an Ethernet interface, a universal serial bus (USB), and/or a Peripheral Component Interconnect (PCI) Express interface.

Additionally, the media crediting analyzer 138 of the illustrated example of FIG. 2 includes the metering data manager 204. The metering data manager 204 analyzes metering data acquired by at least one of the media identifier meter 128 and the network activity meter 130. Further, the metering data manager 204 can, in some such examples, further include the media identifier recognizer 206, the network activity manager 208, and the content determiner 210.

The media identifier recognizer 206 of the illustrated example metering data manager 204 determines if a media identifier further included in metering data of the presented media, as transmitted by the metering database 136, is at least one or recognized or unrecognized. In some such examples, the media identifier recognizer 206 determines if an audio signature of the presented media is at least one or recognized or unrecognized. Additionally or alternatively, the media identifier recognizer 206 determines if an embedded watermark of the presented media is at least one or recognized or unrecognized. Additionally or alternatively, the media identifier recognizer 206 determines if an identifier, included in the one or more of the media 108, 110, and/or 112 in any form detectable by the media identifier meter 128, is at least one or recognized or unrecognized.

Additionally, the media identifier recognizer 206 can further output a flag designating the recognition status of the media presentation. In some such examples, in response to determining the media identifier of the media presentation is recognized, the media identifier recognizer 206 can output a flag that the media is recognized. Additionally or alternatively, in response to determining the media identifier of the media presentation as unrecognized, the media identifier recognizer 206 can output a flag that the media is unrecognized. Additionally or alternatively, in response to not receiving any media identifiers of a media presentation (i.e., the media identifier meter 128 did not transmit any meter data), the media identifier recognizer 206 can output a flag that no media is currently being presented by the media device 124.

The network activity manager 208 of the illustrated example metering data manager 204 can determine whether network activity is detected at the household 120 by the network activity meter 130 and further, whether the network activity is associated with a media presentation. In response to determining that the network activity is associated with the media presentation, the network activity manager 208 is further to determine the media presentation is a streamed media presentation and determine a streaming source (e.g., Netflix®, Hulu®, Sling TV®, MLB.tv, etc.) of the media presentation as presented by the media device 124.

Additionally or alternatively, in response to the network activity manager 208 determining that at no network activity is present or that network activity detected is not associated with a media presentation, the network activity manager is further to determine that the media presentation is a cached media presentation.

The content determiner 210 of the illustrated example metering data manager 204 can determine content identification information of the media presentation presented at the media device 124 based on metering data as stored in the metering database 136. In some such examples, in response to the presented media being indicated as recognized by an output flag from the media identifier recognizer 206, the content identification information can include at least one of a program and episode of the media presentation (e.g., content information), an identifier of the media device, such as the media device 124 in the illustrated example, and at least one of a presentation start time, end time, and period. Additionally or alternatively, in response to the presented media being indicated as unrecognized by an output flag from the media identifier recognizer 206, the content identification information can include at least one of an unrecognized media identifier, an identifier of the media device, such as the media device 124 in the illustrated example, and at least one of a presentation start time, end time, and period.

Additionally or alternatively, the content identification information can include a media ID (e.g., a number, a tag, a code specific to the program and/or episode presented, etc.) of the media presentation. Additionally or alternatively, the media identifier as determined by the content determiner 210 can be any data sequence by which the presented media can be distinguished from alternative presented media.

Additionally, the content determiner 210 can further include a streaming source identifier, previously determined by the network activity manager 208, in the content identification information.

The content identification information library 212 of the illustrated example media crediting analyzer 138 can store content identification information, determined by the metering data manager 204, and further determined as unrecognized by the media identifier recognizer 206. Additionally or alternatively, the content identification information library 212 can store content identification information, determined by the metering data manager 204, and further determined as recognized by the media identifier recognizer 206.

Additionally or alternatively, for each of recognized content identification information and unrecognized content identification information, content identification information stored in the streamed content identification information library can further include at least one of a media identifier, a streaming media device identifier, and a streaming source identifier.

The example content identification information library 212 can be implemented by a volatile memory (e.g., a Synchronous Dynamic Random Access Memory (SDRAM), a Dynamic Random Access Memory (DRAM), RAMBUS Dynamic Random Access Memory (RDAM), etc.) and/or a non-volatile memory (e.g., flash memory). The example content identification information library 212 can additionally or alternatively be implemented by one or more mass storage devices such as hard disk drive(s), compact disk drive(s), digital versatile disk drive(s), solid-state drives(s), etc. While in the illustration the example content identification information library 212 is illustrated as a single database, example content identification information library 212 can be implemented by any number and/or type(s) of databases.

The recognized cached content source determiner 214 of the illustrated example media crediting analyzer 138 can, in some examples, determine a streaming source (e.g., Netflix®, Hulu®, Sling TV®, MLB.tv, etc.) of a cached media presentation previously determined as recognized by the media identifier recognizer 206. Further, determining a streaming source of the recognized cached media presentation includes matching a media credit stored in the media crediting database 140, which can, in some examples, include crediting information for at least one of media device, streaming source, presentation period, and content information, with the media device and content information of the current media presentation.

In response to a match being found in the media crediting database 140, the recognized cached content source determiner 214 can infer the streaming source of the current media presentation from the match. Additionally or alternatively, in response to a match not being found in the media crediting database 140, the recognized cached content source determiner 214 can infer that the current media presentation is not cached from previously streamed media.

The unrecognized cached content source determiner 216 of the illustrated example media crediting analyzer 138 can, in some such examples, determine a streaming source (e.g., Netflix®, Hulu®, Sling TV®, MLB.tv, etc.) of a cached media presentation previously determined as unrecognized by the media identifier recognizer 206. Further, determining a streaming source of the unrecognized cached media presentation includes matching each of a media device identifier and an unrecognized media identifier of the current media presentation with each of a media device and unrecognized media identifier of previously streamed media as stored in the content identification information library 212.

In response to a match being found in the content identification information library 212, the unrecognized cached content source determiner 216 can infer the streaming source of the current media presentation from the match. Additionally or alternatively, in response to a match not being found in the content identification information library 212, the unrecognized cached content source determiner 216 can infer that the current media presentation is not cached from previously streamed media.

The example media credit manager 218 of the illustrated example of FIG. 2 prepares one or more media credit(s) indicative of the presentation of media on media devices. In some such examples, the media credit manager 218 can further distribute the one or more media credit(s) generated to the media crediting database 140.

In some examples, in response to the media presentation being streamed and recognized, the media credit manager 218 generates a credit result including at least one of a content identifier, a media device identifier, a presentation period, and a streaming source identifier. Additionally or alternatively, in response to the media presentation being streamed and unrecognized, the media credit manager 218 generates a credit result including at least one of a media device identifier, a presentation period, and a streaming source identifier.

Additionally or alternatively, in response to the media presentation being cached and recognized, the media credit manager 218 generates a credit result including at least one of a content identifier, a media device identifier, a presentation period, and an inferred streaming source identifier. Additionally or alternatively, in response to the media presentation being neither of cached or streamed, and recognized, the media credit manager 218 generates a credit result including at least one of a content identifier, and presentation period.

Additionally or alternatively, in response to the media presentation being cached and unrecognized, the media credit manager 218 generates a credit result including at least one of a media device identifier, a presentation period, and an inferred streaming source identifier. Additionally or alternatively, in response to the media presentation being neither of cached or streamed, and unrecognized, the media credit manager 218 generates a credit including a presentation period.

In operation, the example media crediting analyzer 138 receives at least one of analyzed and unanalyzed metering data from the metering database 136, via the database interface 202. In response to receiving metering data, the media crediting analyzer further distributes the metering data to the metering data manager 204, wherein the media identifier recognizer 206 can determine and indicate the media identifier as at least one of recognized or unrecognized. Additionally, the network activity manager 208 can determine whether a media presentation is streamed or cached and, in response to determining the presentation is streamed, can further determine a streaming source of the media presentation. In response to each of the media identifier recognizer 206 and network activity manager 208 completing respective determinations, the content determiner 210 determines content information which can, in some examples, include at least one of a media device identifier, a streaming source identifier, a program, an episode, and/or media ID, of the media presentation.

In response to the network activity manager 208 determining the presence of substantial network activity, the media credit manager 218 generates a media credit for the media presentation. Additionally or alternatively, in response to the absence of substantial network activity, and determining the media identifier is recognized, the recognized cached content source determiner 214 infers a streaming source for the media presentation based on a credit result stored in the media crediting database 140. Further, the media credit manager 218 generates a media credit for the media presentation. Additionally or alternatively, in response to the absence of substantial network activity, and determining the media identifier is unrecognized, the unrecognized cached content source determiner 216 infers a streaming source for the media presentation based on media device identifiers and unrecognized media identifiers (i.e., content identification information) stored in the content identification information library 212. Further, the media credit manager 218 generates a media credit for the media presentation.

Although the example media crediting analyzer 138 of FIG. 2 includes one database interface 202, one metering data manager 204 which can, in some examples, include one media identifier recognizer 206, one network activity manager 208, and one content determiner 210, one content identification information library 212, one recognized cached content source determiner 214, one unrecognized cached content source determiner 216, and one media credit manager 218, the media crediting analyzer 138 as disclosed herein can be used with any number(s) of database interfaces 202, metering data managers 204 which can, in some examples, be used with any number(s) of media identifier recognizers 206, network activity managers 208, and content determiners 210, content identification information libraries 212, recognized cached content source determiners 214, unrecognized cached content source determiners 216, and media credit managers 218.

While an example manner of implementing the content crediting facility 134 of FIG. 1 is illustrated in FIG. 2, one or more of the elements, processes and/or devices illustrated in FIG. 2 may be combined, divided, re-arranged, omitted, eliminated and/or implemented in any other way. Further, the example metering database 136, the example media crediting analyzer 138 which can, in some such examples, include the example database interface 202, the example metering data manager 204 which can, in some such examples, include the media identifier recognizer 206, the network activity manager 208, and the content determiner 210, the content identification information library 212, the recognized cached content source determiner 214, the unrecognized cached content source determiner 216, and the media credit manager 218, and/or, more generally, the example content crediting facility 134 of FIG. 1 may be implemented by hardware, software, firmware and/or any combination of hardware, software and/or firmware. Thus, for example, any of the example metering database 136, the example media crediting analyzer 138 which can, in some such examples, include the example database interface 202, the example metering data manager 204 which can, in some such examples, include the media identifier recognizer 206, the network activity manager 208, and the content determiner 210, the content identification information library 212, the recognized cached content source determiner 214, the unrecognized cached content source determiner 216, and the media credit manager 218, and/or, more generally, the example content crediting facility 134 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example metering database 136, the example media crediting analyzer 138 which can, in some such examples, include the example database interface 202, the example metering data manager 204 which can, in some such examples, include the media identifier recognizer 206, the network activity manager 208, and the content determiner 210, the content identification information library 212, the recognized cached content source determiner 214, the unrecognized cached content source determiner 216, and the media credit manager 218, and/or, more generally, the example content crediting facility 134 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example content crediting facility 134 of FIG. 1 may include one or more elements, processes and/or devices in addition to, or instead of, those illustrated in FIG. 2, and/or may include more than one of any or all of the illustrated elements, processes and devices.

Figure 3:
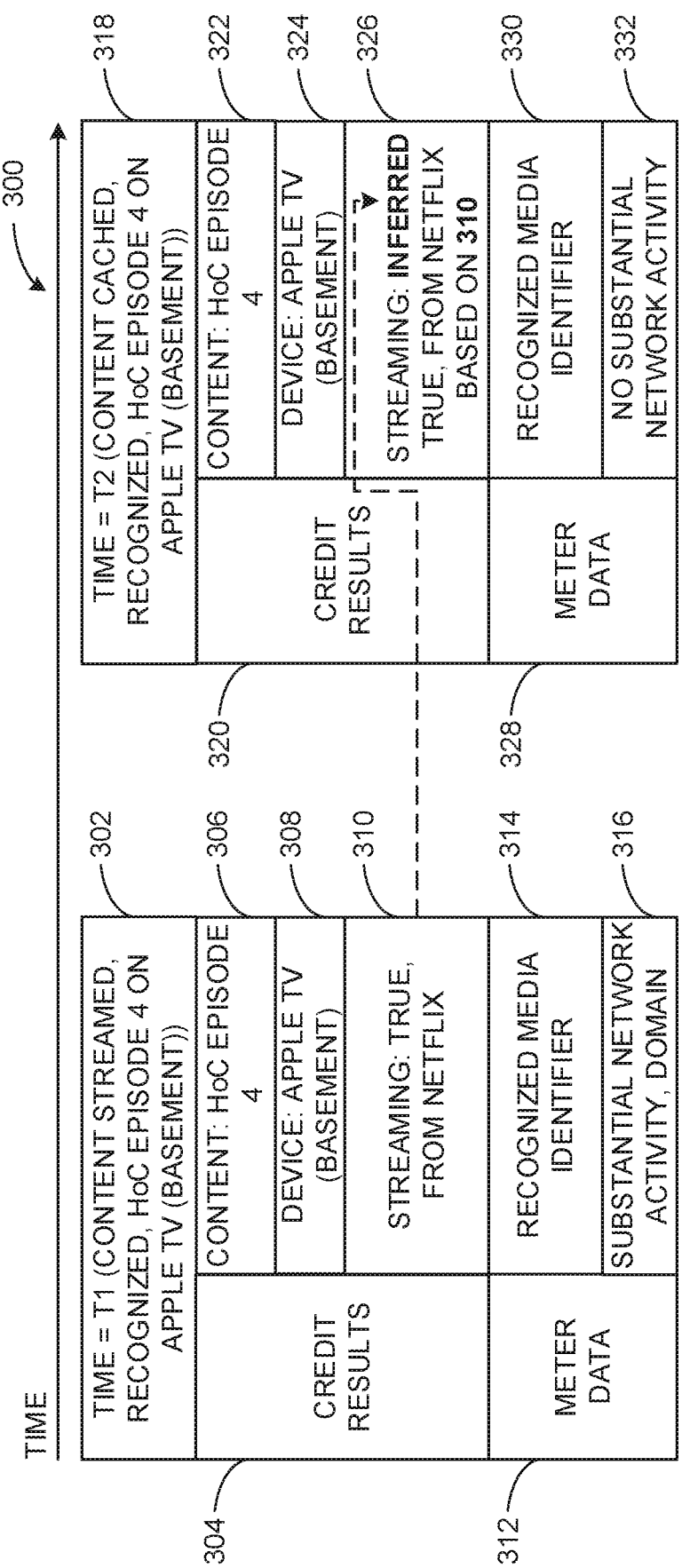
FIG. 3 is a diagram showing the processing of data for one example implementation of the media crediting analyzer of FIG. 2.

FIG. 3 illustrates an example process 300 for identifying streaming activity and streaming source for cached media on media devices by the recognized cached content source determiner 214 in response to a media identifier of a media presentation being indicated as recognized by the media identifier recognizer 206. An example data set 302 is taken at a time T1 for an example streaming media presentation, HoC Episode 4 on an Apple TV (basement) in the illustrated example. Further, the example data set 302 includes a credit result 304 which can, in some examples, include at least one of a content identifier field 306, a media device identifier field 308, and a streaming identifier field 310, and meter data 312 which can, in some examples, include media identifier 314, and network activity and source information 316.

Further, for data set 302 at time T1, the content identifier field 306, determined from a media identifier analyzed by the content determiner 210, indicates "Content: HoC Episode 4", the media device identifier field 308, determined from a media identifier analyzed by the content determiner 210, indicates "Device: Apple TV (Basement)", and the streaming identifier field 310, determined from network activity analyzed by the network activity manager 208, indicates "Streaming: true, from Netflix". Further, due to the streaming nature of the media at time T1, the network activity and source information 316, determined by the network activity manager 208, indicates at least one of substantial network activity and a streaming source at T1. In some such examples, the streaming source can be determined using an IP address of the network activity. Additionally or alternatively, the streaming source can be determined using packet information included in the network activity.

Additionally, FIG. 3 includes an example data set 318, taken at a time T2 for an example cached media presentation which was previously streamed, HoC Episode 4 on an Apple TV (basement) in the illustrated example. Data set 318 further includes a credit result 320 which can, in some examples, include at least one of a content identifier field 322, a media device identifier field 324, and a streaming identifier field 326, and meter data 328 which can, in some examples, include media identifier 330, and network activity and source information 332.

For data set 318 at time T2 (media presentation is now cached), the content identifier field 322, determined from a media identifier analyzed by the content determiner 210, indicates "Content: HoC Episode 4", the media device identifier field 324, determined from a media identifier analyzed by the content determiner 210, indicates "Device: Apple TV (Basement)", and the streaming identifier field 326 indicates "Streaming: inferred true, from Netflix based on 310". In such examples, the streaming identifier field 326 is inferred from a credit result of previously streamed media (i.e., credit result 304 in the illustrated example). Further, in the example process 300, the streaming identifier field 326 is inferred from the streaming identifier field 310, for which the media presentation was identified as "Streaming: true, from Netflix" at T1. Additionally, due to the cached storage of the media at T2, the network activity and source information 332 indicates no substantial network activity at T2.

Figure 4:
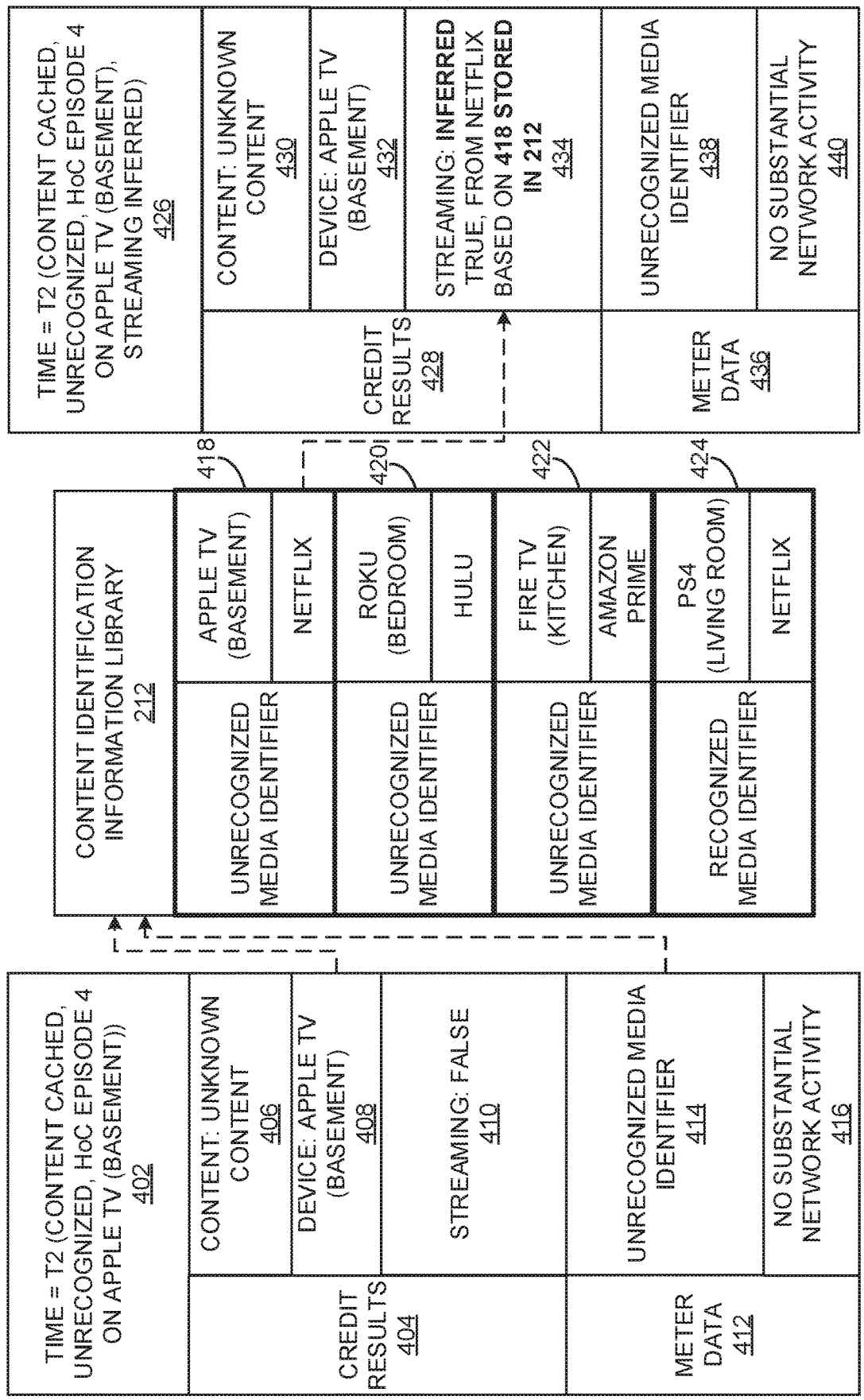
FIG. 4 is a diagram showing the processing of data for an alternate example implementation of the media crediting analyzer of FIG. 2.

FIG. 4 illustrates an example process 400 for identifying streaming activity and identifying a source of cached media on media devices by the unrecognized cached content source determiner 216 in response to a media identifier of a media presentation indicated as unrecognized by the media identifier recognizer 206.

An example data set 402 is taken at a time T2 for a cached and unrecognized media presentation, HoC Episode 4 on an Apple TV (basement) in the illustrated example. The example data set 402 includes a credit result 404 which can, in some examples, include at least one of a content identifier field 406, a media device identifier field 408, and a streaming identifier field 410, and meter data 412 which can, in some examples, include unrecognized media identifier 414, and network activity and source information 416.

Further, for data set 402 at time T2, the content identifier field 406, determined from a media identifier analyzed by the content determiner 210, indicates "Content: Unknown content", the media device identifier field 408, determined from a media identifier analyzed by the content determiner 210, indicates "Device: Apple TV (Basement)", and the streaming identifier field 410, determined by network activity analyzed by the network activity manager 208, indicates "Streaming: False". Further, due to the cached storage of the media at time T2, the network activity and source information 416 indicates no substantial network activity at time T2.

FIG. 4 additionally includes an illustrated example of the content identification information library 212 which can, in some such examples, include one or more content identification information data set(s) 418, 420, 422, and/or 424. Further, content identification information data set 418 includes an unrecognized media identifier for a media presentation which was streamed from Netflix to an Apple TV located in a basement. Additionally, content identification information data set 420 includes an unrecognized media identifier for a media presentation which was streamed from Hulu to a Roku located in a bedroom. Additionally, content identification information data set 422 includes an unrecognized media identifier for a media presentation which was streamed from Amazon Prime to a Fire TV in a kitchen. Additionally, content identification information data set 424 includes a recognized media identifier for a media presentation which was streamed from Netflix to a PS4 in a living room.

FIG. 4 also includes an example data set 426, taken at a time T2 for a cached and unrecognized media presentation that was previously streamed, HoC Episode 4 on an Apple TV (basement) in the illustrated example. Data set 426 further includes a credit result 428 which can, in some examples, include at least one of a content identifier field 430, a media device identifier field 432, and a streaming identifier field 434, and meter data 436 which can, in some examples, include an unrecognized media identifier 438, and network activity and source information 440.

Further, for data set 426 at time T2, the content identifier field 430, determined from a media identifier analyzed by the content determiner 210, indicates "Content: Unknown content", the media device identifier field 432, determined from a media identifier analyzed by the content determiner 210, indicates "Device: Apple TV (Basement)", and the streaming identifier field 434, which can be determined utilizing methods described below, indicates "Streaming: Inferred true, from Netflix Based on 418 stored in 212". Further, due to the cached storage of the media at time T2, the network activity and source information 440 indicates no substantial network activity at time T2.

Further detailing the streaming identifier field 434, in response to the content identifier field 406 indicating "Content: Unknown content", and the streaming identifier field 410 indicating "Streaming: False", at least one of the media device identifier field 408 (Apple TV (Basement) in the illustrated example) and the unrecognized media identifier 414 is(are) distributed to the content identification information library 212 for matching. In response to the media device identifier field 408 and the unrecognized media identifier 414 matching one or more of the content identification information data set(s) 418, 420, 422, and/or 424 as stored in the content identification information library 212, it can be inferred that the current media presentation is cached and the streaming source can, in some such examples, be inferred. In the illustrated example, content identification information data set 418 matches the media device identifier field 408 and the unrecognized media identifier 414.

In response to content identification information data set 418 matching the media device identifier field 408 and the unrecognized media identifier 414, the streaming identifier field 434 for data set 426 at time T2 indicates "Streaming: Inferred true, from Netflix based on 418 stored in 212".

Figure 5A:
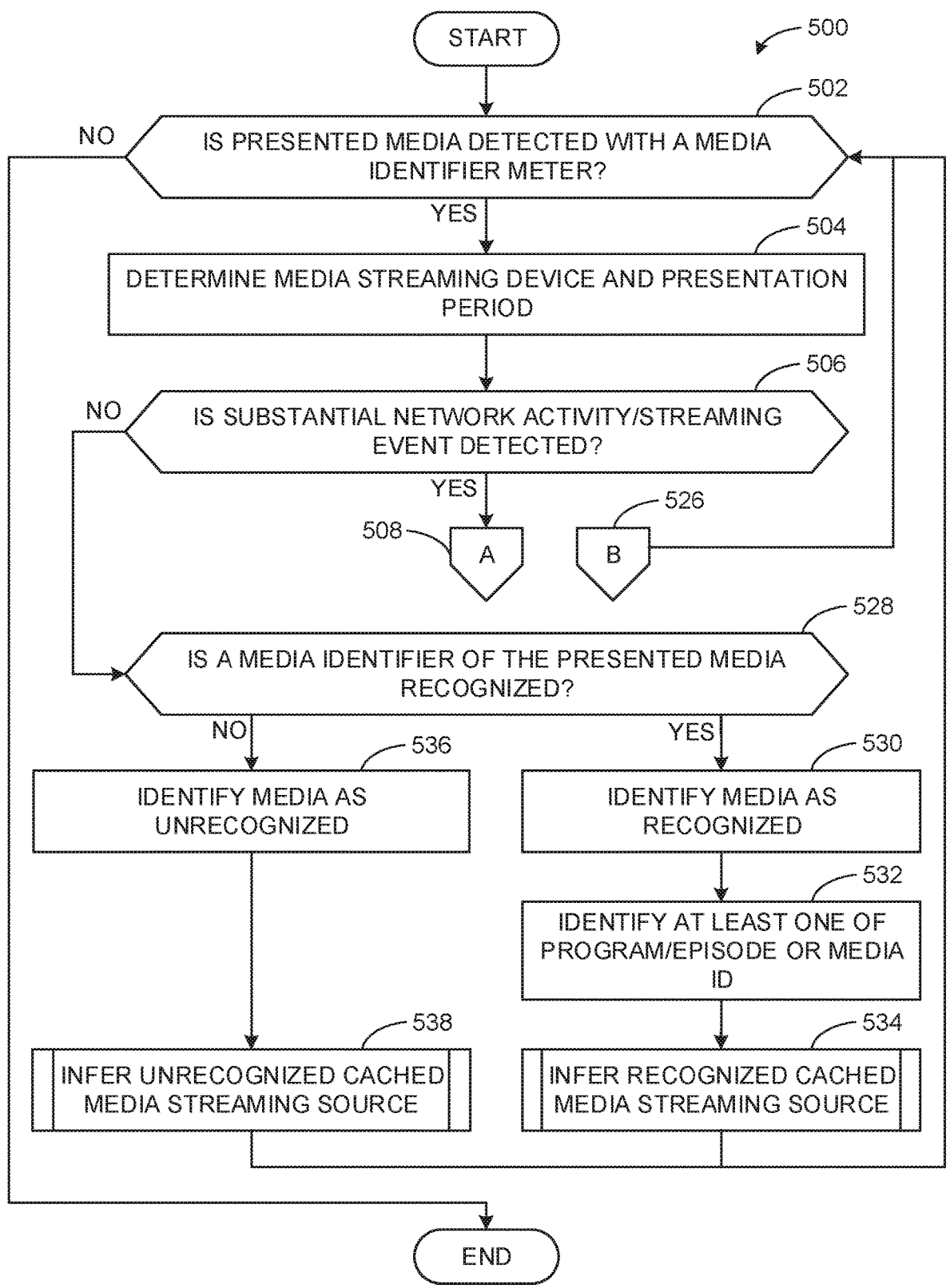
FIGS. 5A and 5B are a flowchart representative of example machine-readable instructions that may be executed to implement the example system of FIG. 1.
Figure 5B:
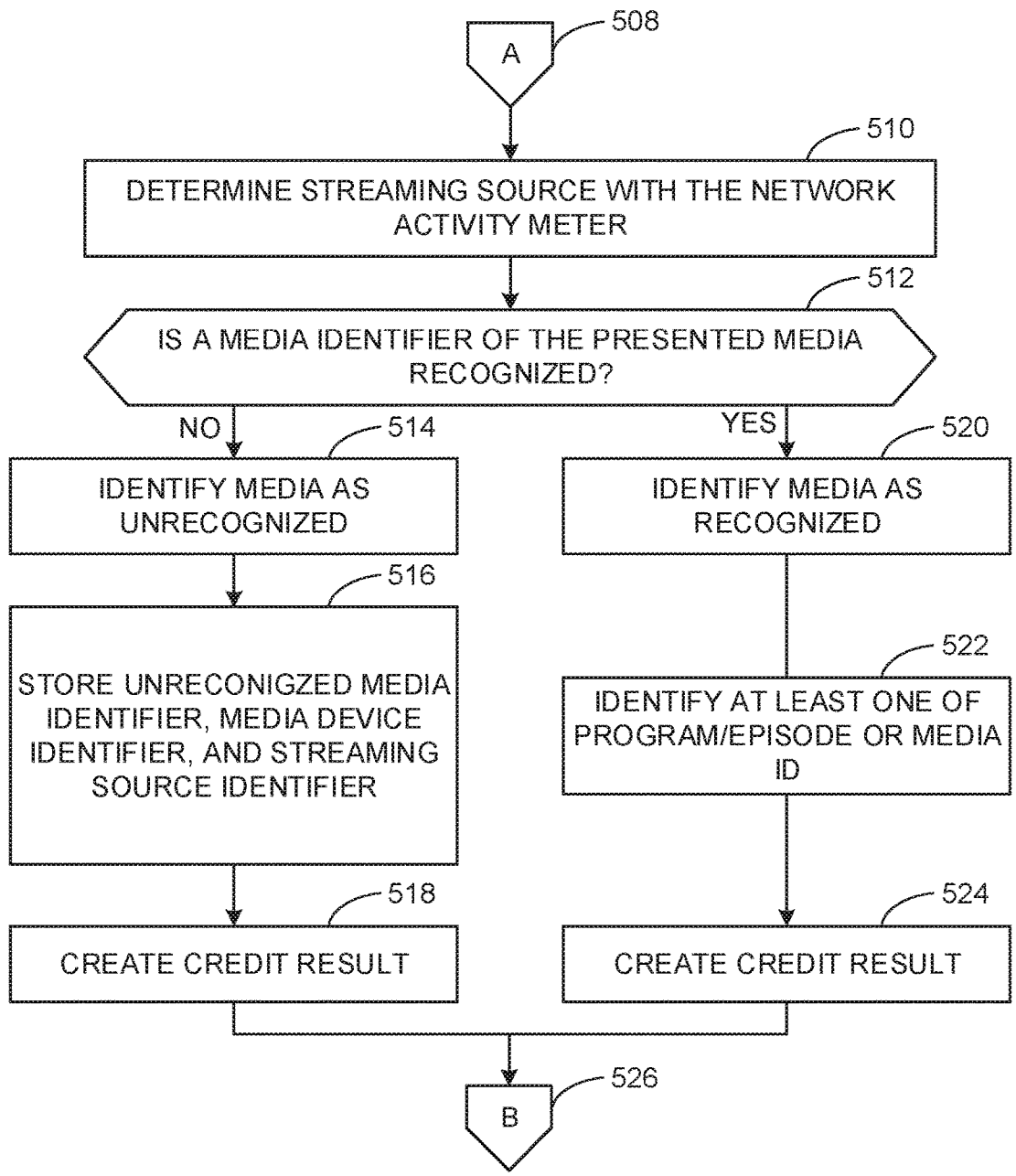
Figure 6:
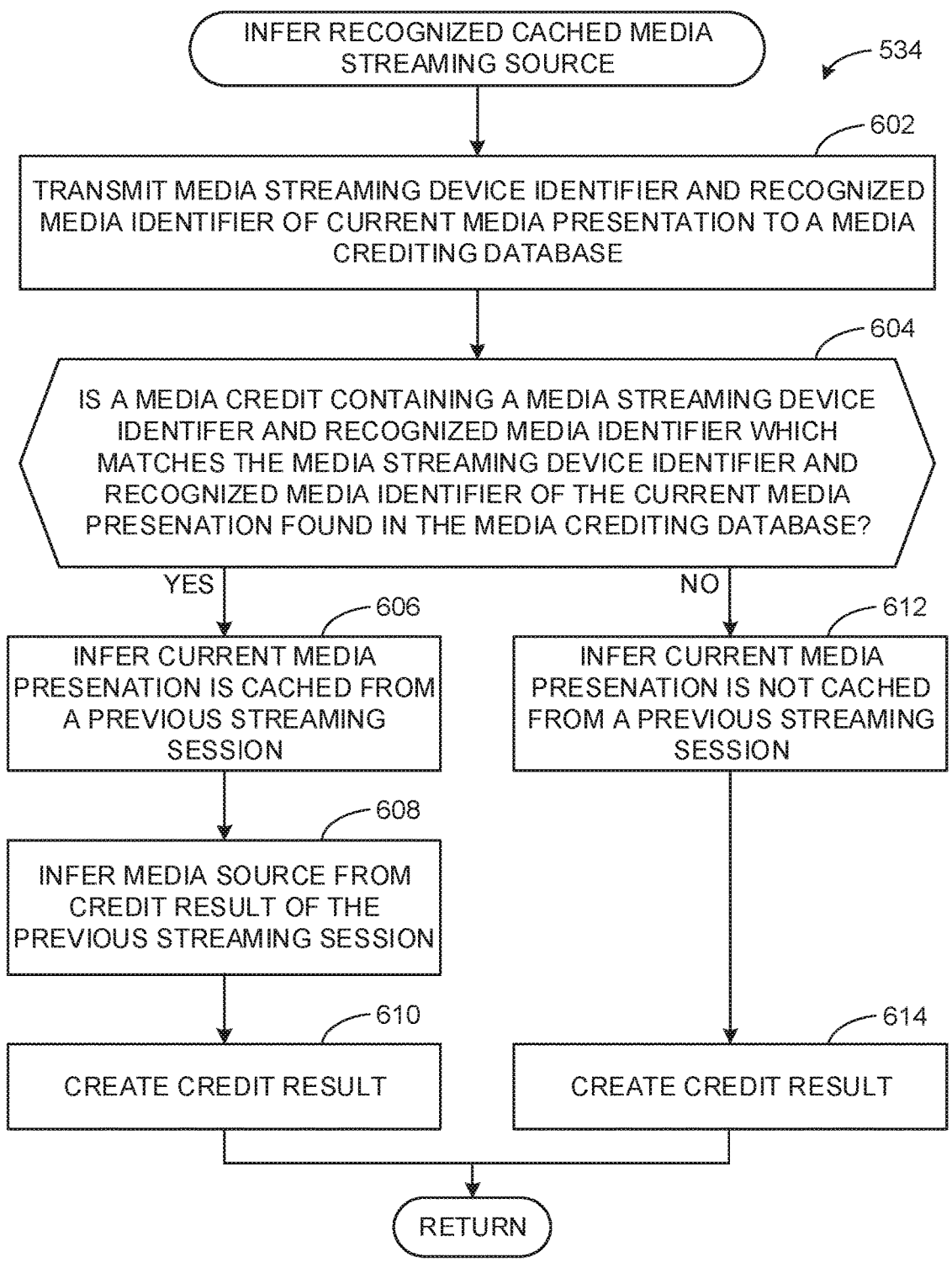
FIG. 6 is a flowchart representative of example machine-readable instructions that may be executed to implement the example content crediting facility of FIG. 2 for the process of FIG. 3.
Figure 7:
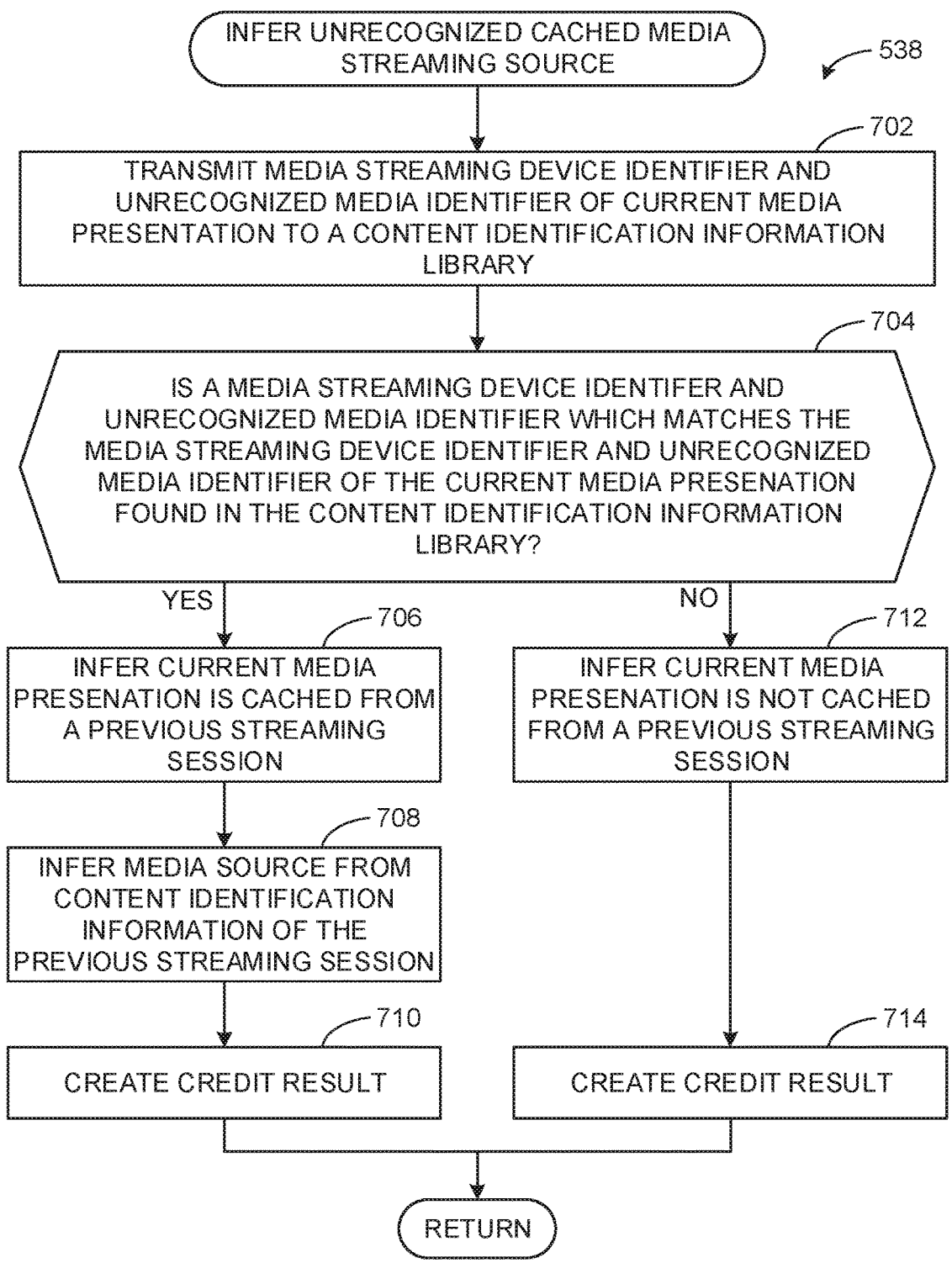
FIG. 7 is a flowchart representative of example machine-readable instructions that may be executed to implement the example content crediting facility of FIG. 2 for the process of FIG. 4.

A flowchart representative of example machine readable instructions for implementing the content crediting facility 134 is shown in FIGS. 5-7. In this example, the machine readable instructions comprise a program for execution by a processor such as a processor 812 shown in an example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-7, many other methods of implementing the example content crediting facility 134 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Example machine readable instructions 500 that may be executed to perform identification of streaming activity and streaming source for cached media presentations in the example system 100 of FIG. 1 are illustrated in FIG. 5. With reference to the preceding figures and associated descriptions, the example machine readable instructions 500 of FIG. 5 begin execution at block 502 at which the media identifier meter 128 detects a media identifier of a media presentation presented at the media device 124. Further, at block 502, the database interface 202 at least one of receives the metering data of the media presentation detected by the media identifier meter 128 and distributes the metering data of the media presentation to at least one of the metering data manager 204 and the media credit manager 218. Once all available metering data is received and distributed, processing transfers to block 504.

At block 504, in response to all available metering data being received and distributed by the database interface 202, the metering data manager 204 determines, from metering data received from the metering database 136, at least one of a media device and presentation period for a media presentation. In some such examples, the media credit manager 218 is further to generate a media credit for at least one of a media device and presentation period.

At block 506, in response to completion of the determination and media credit generation for media device and presentation period, the network activity manager 208 is further to determine if substantial network activity, as detected by the network activity meter 130, is detected. In some such examples, substantial network activity is indicative of a streamed media presentation. Additionally or alternatively, the absence of substantial network activity is indicative of at least one of a cached presentation of a previously streamed media presentation or a media presentation presented that is neither streamed or cached (e.g., presentation of a DVD, Blu-Ray, digital download, VHS, etc.)

Further at block 506, in response to the network activity manager 208 determining that substantial network activity is present, processing transfers to block 510, via block 508. Additionally or alternatively, in response to the absence of substantial network activity, processing transfers to block 528.

At block 510, in response to the network activity manager 208 determining that substantial network activity is present, the network activity manager 208 is further to, utilizing network activity information of metering data acquired by the network activity meter 130, determine a streaming source (e.g., Netflix®, Hulu®, Sling TV®, MLB.tv, etc.) of the media presentation. In some such examples, the network activity manager 208 determines a streaming source of the media presentation utilizing an IP address of the network activity. Additionally or alternatively, the network activity manager 208 determines a streaming source of the media presentation utilizing packet information of the network activity. In some such examples, the media credit manager 218 is further to generate a media credit identifying the streaming source.

At block 512, the media identifier recognizer 206 determines if a media identifier as received by the metering data manager 204 is at least one or recognized or unrecognized. In some such examples at block 512, the media identifier recognizer 206 determines if an audio signature of the presented media is recognized. Additionally or alternatively, the media identifier recognizer 206 determines if an embedded watermark of the presented media is recognized. Additionally or alternatively, the media identifier recognizer 206 determines if content identification information, acquired from one or more of the media 108, 110, and/or 112 in any form detectable by the media identifier meter 128, is recognized.

At block 514, in response to determining a media identifier is unrecognized, the media identifier recognizer 206 further indicates the media presentation as unrecognized.

At block 516, in response to the media identifier being indicated as unrecognized, the content identification information library 212 stores at least one of a media device identifier, a streaming source identifier, and the unrecognized media identifier as content identification information.

At block 518, further in response to receiving content identification information from the metering data manager 204 indicated as unrecognized, the media credit manager 218 generates a credit result that credits at least one of the media device identifier, the streaming source identifier, and a presentation period.

At block 520, in response to determining a media identifier is recognized, the media identifier recognizer 206 indicates the media presentation as recognized.

At block 522, further in response to receiving a media identifier indicated as recognized, the content determiner 210 determines a content identifier, which can include at least one of a program, episode, and/or media ID (e.g., a number, a tag, a code specific to the program and/or episode presented, etc.) of the media presentation.

At block 524, further in response to receiving content identification information from the metering data manager 204 indicated as recognized, the media credit manager 218 generates a credit result that credits at least one of the media device identifier, the streaming source identifier, a presentation period, and a content identifier.

Upon completion of at least one of block 518 or block 524, processing returns to block 502, via block 526.

At block 528, in response to the media credit manager 218 determining that substantial network activity is absent (i.e., the media presentation is not currently being streamed), the media identifier recognizer 206 determines whether a media identifier as received by the metering data manager 204 is at least one or recognized or unrecognized. In some such examples at block 528, the media identifier recognizer 206 determines if an audio signature of the presented media is recognized. Additionally or alternatively, the media identifier recognizer 206 determines if an embedded watermark of the presented media is recognized. Additionally or alternatively, the media identifier recognizer 206 determines if a media identifier, acquired from one or more of the media 108, 110, and/or 112 in any form detectable by the media identifier meter 128, is recognized.

At block 530, in response to determining a media identifier is recognized, the media identifier recognizer 206 indicates the media presentation as recognized.

At block 532, further in response to receiving a media identifier indicated as recognized, the content determiner 210 determines content identification, which can include at least one of a program, episode, and/or media ID (e.g., a number, a tag, a code specific to the program and/or episode presented, etc.) of the media presentation.

At block 534, further in response to receiving content identification information from the metering data manager 204 indicated as recognized, described in further detail below, the recognized cached content source determiner 214 infers the cached media streaming source.

At block 536, in response to determining a media identifier is unrecognized, the media identifier recognizer 206 indicates the media presentation as unrecognized.

At block 538, further in response to receiving content identification information from the metering data manager 204 indicated as unrecognized, described in further detail below, the unrecognized cached content source determiner 216 infers the cached media streaming source.

Example machine readable instructions that may be executed to infer a recognized cached media streaming source (FIG. 5, block 534) of a media presentation by the media crediting analyzer 138 of FIG. 2 are illustrated in FIG. 6. With reference to the preceding figures and associated descriptions, the example method of FIG. 6 begins execution at block 602 at which the recognized cached content source determiner 214 transmits, for a media presentation presented at the media device 124, at least one of a media device identifier and a recognized media identifier to the media crediting database 140.

At block 604, the example recognized cached content source determiner 214 is further to, using the media crediting database 140, match the media device identifier and a recognized media identifier of the current media presentation with a credit result of previously streamed media, as stored in the media crediting database 140.

At block 606, in response to finding a match, the example recognized cached content source determiner 214 infers that the current media presentation is a cached presentation of previously streamed media.

At block 608, the recognized cached content source determiner 214 further infers a streaming source of the current cached presentation based upon the credit result of previously streamed media, as stored in the media crediting database 140.

At block 610, the media credit manager 218 generates a media credit result including at least one of a media device identifier, a streaming source identifier, a presentation period, and a content identifier.

At block 612, in response to the recognized cached content source determiner 214 being unable to find a match for the media device identifier and a recognized media identifier of the current media presentation in the media crediting database 140, the recognized cached content source determiner 214 infers that the current media presentation is not a cached media presentation.

At block 614, the media credit manager 218 generates a media credit result including a presentation period, and a content identifier. Upon completion of at least one of block 610 or block 614, processing transfers to block 502 of the example machine readable instructions 500 of FIG. 5.

Example machine readable instructions that may be executed to infer an unrecognized cached media streaming source (FIG. 5, block 538) of a media presentation by the media crediting analyzer 138 of FIG. 2 are illustrated in FIG. 7. With reference to the preceding figures and associated descriptions, the example method of FIG. 7 begins execution at block 702 at which the unrecognized cached content source determiner 216 transmits, for a media presentation presented at the media device 124, at least one of a media device identifier and an unrecognized media identifier to the content identification information library 212.

At block 704, the example unrecognized cached content source determiner 216 is further to, using the content identification information library 212, match the media device identifier and an unrecognized media identifier of the current media presentation with a media device identifier and an unrecognized media identifier of previously streamed media, as stored in the content identification information library 212.

At block 706, in response to finding a match, the example unrecognized cached content source determiner 216 infers that the current media presentation is a cached presentation of previously streamed media.

At block 708, the unrecognized cached content source determiner 216 further infers a streaming source of the current cached presentation based upon the media device identifier and an unrecognized media identifier of previously streamed media, as stored in the content identification information library 212.

At block 710, the media credit manager 218 generates a media credit including at least one of a media device identifier, a streaming source identifier, and a presentation period.

At block 712, in response to the unrecognized cached content source determiner 216 being unable to find a match for the media device identifier and an unrecognized media identifier of the current media presentation in the content identification information library 212, the unrecognized cached content source determiner 216 infers that the current media presentation is not a cached media presentation.

At block 714, the media credit manager 218 generates a media credit including a presentation period. Upon completion of at least one of block 710 or block 714, processing transfers to block 502 of the example machine readable instructions 500 of FIG. 5.

Figure 8:
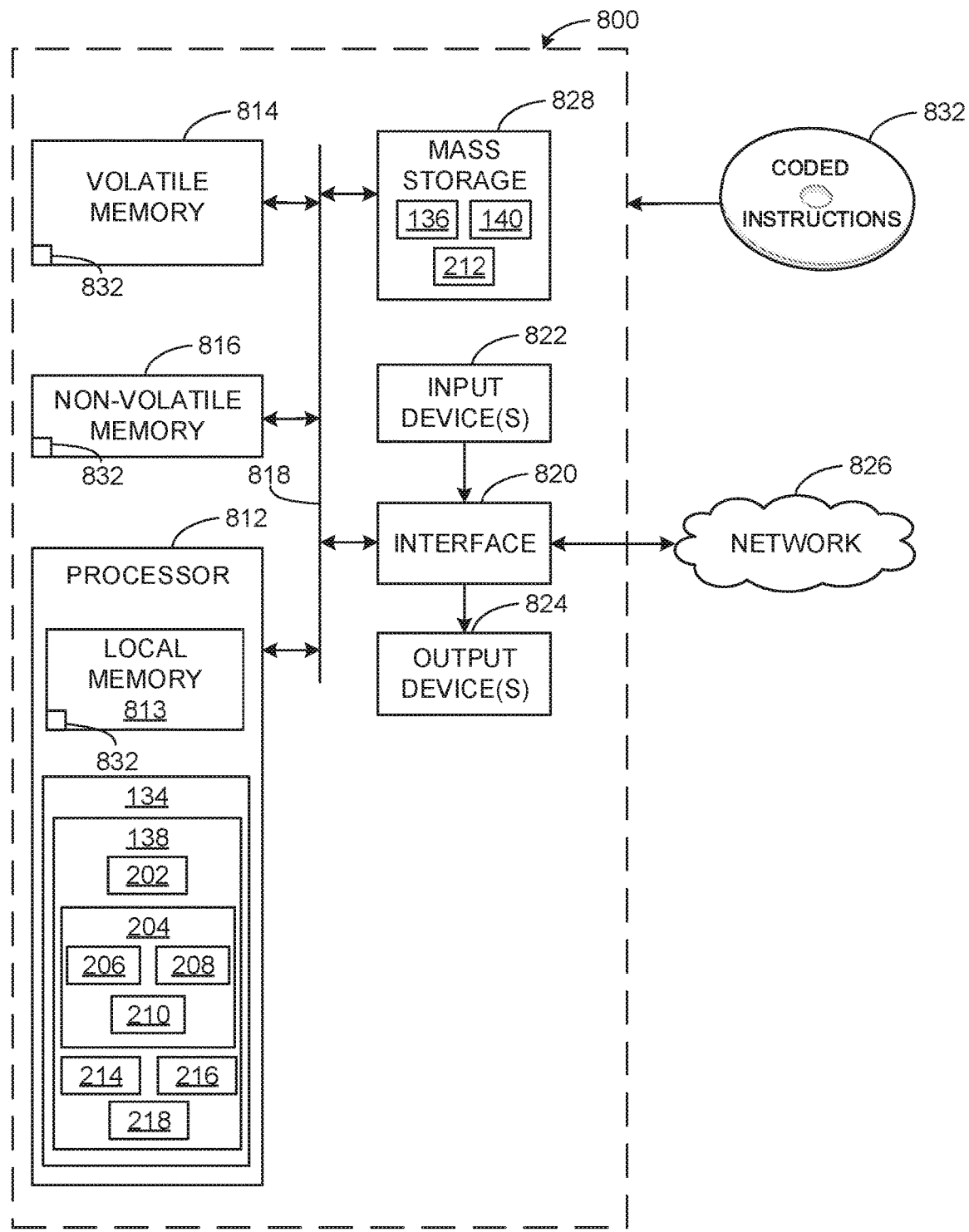
FIG. 8 is a block diagram of an example processor platform capable of executing the example instructions of FIGS. 5, 6, and/or 7 to implement the example system of FIG. 1.

FIG. 8 is a block diagram of an example processor platform 800 capable of executing the instructions of FIGS. 5-7 to implement the apparatus of FIG. 2. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the content crediting facility 134 which further includes the media crediting analyzer 138 which can, in some such examples, include the database interface 202, the metering data manager 204 which can, in some examples, include the media identifier recognizer 206, the network activity manager 208, and the content determiner 210, the recognized cached content source determiner 214, the unrecognized cached content source determiner 216, and the media credit manager 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint device and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, CD drives, Blu-ray disk drives, redundant array of independent disks (RAID) systems, and DVD drives.

The coded instructions 832 of FIGS. 5-7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed that are capable of identification of at least one of streaming activity and streaming source for cached media on media streaming devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to process cached content, the apparatus comprising:
   interface circuitry;
   machine readable instructions; and
   programmable circuitry to at least one of instantiate or execute the machine readable instructions to:
      cause first content identification information of a first media presentation to be stored in a content identification information library, wherein the first media presentation is a streamed media presentation;
      in response to determining an absence of network activity associated with a second media presentation, determine if a media identifier of the second media presentation is stored in the content identification information library; and
      in response to determining the media streaming device identifier and the media identifier of the second media presentation are not stored in the content identification information library, generate a second media credit for the second media presentation.

2. The apparatus of claim 1, wherein the programmable circuitry is to determine that the second media presentation is at least one of a digital video disk (DVD), Blu-Ray, digital download, or a video home system (VHS) in response to inferring that the second media presentation is not cached from a previous streaming session.

3. The apparatus of claim 1, wherein the programmable circuitry is further to, in response to determining the media identifier of the second media presentation is unrecognized, transmit a presentation start time with the media streaming device identifier and the unrecognized media identifier to the content identification information library.

4. The apparatus of claim 1, wherein the programmable circuitry is further to, in response to determining the media identifier of the second media presentation is unrecognized, transmit a presentation end time with the media streaming device identifier and the unrecognized media identifier to the content identification information library.

5. The apparatus of claim 1, wherein the programmable circuitry is further to, in response to determining the media identifier of the second media presentation is unrecognized, transmit a presentation period with the media streaming device identifier and the unrecognized media identifier to the content identification information library.

6. The apparatus of claim 1, wherein the programmable circuitry is further to output a flag designating a recognition status of the second media presentation.

7. The apparatus of claim 1, wherein the programmable circuitry is further to determine an absence of network activity associated with the second media presentation by determining if the network activity is equal to or less than a volume of network activity to support streaming the second presentation.

8. The apparatus of claim 1, wherein in response to determining that the media streaming device identifier and the media identifier of the second media presentation is not found in the content identification information library, the programmable circuitry is to:
 infer the second media presentation is not cached from a previous streaming session; and
 generate a third media credit for the second media presentation.

9. A non-transitory machine readable storage medium comprising instructions, that, when executed cause a machine to at least:
 cause first content identification information of a first media presentation to be stored in a content identification information library, wherein the first media presentation is a streamed media presentation;
 in response to determining an absence of network activity associated with a second media presentation, determine if a media identifier of the second media presentation is stored in the content identification information library; and
 in response to determining the media streaming device identifier and the media identifier of the second media presentation are not stored in the content identification information library, generate a second media credit for the second media presentation.

10. The non-transitory machine readable storage medium of claim 9, wherein the instructions cause the machine to determine that the second media presentation is at least one of a digital video disk (DVD), Blu-Ray, digital download, or a video home system (VHS) in response to inferring that the second media presentation is not cached from a previous streaming session.

11. The non-transitory machine readable storage medium of claim 9, wherein the instructions cause the machine to, in response to determining the media identifier of the second media presentation is unrecognized, transmit a presentation start time with the media streaming device identifier and the unrecognized media identifier to the content identification information library.

12. The non-transitory machine readable storage medium of claim 9, wherein the instructions cause the machine to, in response to determining the media identifier of the second media presentation is unrecognized, transmit a presentation end time with the media streaming device identifier and the unrecognized media identifier to the content identification information library.

13. The non-transitory machine readable storage medium of claim 9, wherein the instructions cause the machine to, in response to determining the media identifier of the second media presentation is unrecognized, transmit a presentation period with the media streaming device identifier and the unrecognized media identifier to the content identification information library.

14. The non-transitory machine readable storage medium of claim 9, wherein the instructions cause the machine to output a flag designating a recognition status of the media presentation.

15. The non-transitory machine readable storage medium of claim 9, wherein the instructions cause the machine to determine an absence of network activity associated with the second media presentation by determining if the network activity is equal to or less than a volume of network activity to support streaming the second presentation.

16. The non-transitory machine readable storage medium of claim 9, wherein in response to determining that the media streaming device identifier and the media identifier of the second media presentation is not found in the content identification information library, the instructions cause the machine to:
 infer the second media presentation is not cached from a previous streaming session; and
 generate a third media credit for the second media presentation.

17. A method for processing cached content, the method comprising:
 causing, via at least one processor, first content identification information of a first media presentation to be stored in a content identification information library, wherein the first media presentation is a streamed media presentation;
 in response to determining an absence of network activity associated with a second media presentation, determining, via at least one processor, if a media identifier of the second media presentation is stored in the content identification information library; and
 in response to determining the media streaming device identifier and the media identifier of the second media presentation are not stored in the content identification information library, generating, via at least one processor, a second media credit for the second media presentation.

18. The method of claim 17, further including determining that the second media presentation is at least one of a digital video disk (DVD), Blu-Ray, digital download, or a video home system (VHS) in response to inferring that the second media presentation is not cached from a previous streaming session.

19. The method of claim 17, further including, in response to determining the media identifier of the second media presentation is unrecognized, transmitting a presentation start time with the media streaming device identifier and the unrecognized media identifier to the content identification information library.

20. The method of claim 17, further including, in response to determining the media identifier of the second media presentation is unrecognized, transmitting a presentation end time with the media streaming device identifier and the unrecognized media identifier to the content identification information library.

* * * * *